Jan. 31, 1967     L. H. MAURER     3,301,626
METHOD OF PRODUCING COLORED ANIMATED CARTOONS
Filed June 5, 1963     2 Sheets-Sheet 1

INVENTOR.
LEON H. MAURER
BY Hans Berman
AGENT

Jan. 31, 1967  L. H. MAURER  3,301,626
METHOD OF PRODUCING COLORED ANIMATED CARTOONS
Filed June 5, 1963  2 Sheets-Sheet 2

INVENTOR.
LEON H. MAURER
BY
Hans Berman
AGENT

United States Patent Office 3,301,626
Patented Jan. 31, 1967

3,301,626
METHOD OF PRODUCING COLORED
ANIMATED CARTOONS
Leon H. Maurer, New York, N.Y., assignor to Westworld
Artists Productions Inc., New York, N.Y.
Filed June 5, 1963, Ser. No. 285,622
13 Claims. (Cl. 352—38)

This invention relates to a photographic method of making animated colored cartoons.

The first animated black-and-white cartoons were produced from images drawn by artists and showing sequential positions of a moving object on separate sheets. The sheets were photographed on consecutive frames of a motion picture film. When the film or a print thereof was projected on a screen by means of conventional motion picture equipment, the illusion of a moving object was produced. The human eye sees continuous movement if still pictures of sequential positions are presented at a rate of approximately 24 frames per second. The artist's labor required in producing hand-drawn images for an animated cartoon having a returning time of only a few minutes is staggering.

In an effort to eliminate the need for at least a major portion of the artist's work, methods have previously been developed for producing outline images of live actors or other moving objects from motion picture films of live scenes which were subjected to special processing in the darkroom or laboratory. Methods for producing line image or outline motion pictures from motion pictures of live scenes have been disclosed, for example, in United States Patents 2,181,405 and 2,998,313, and in my copending applications Serial No. 104,323 filed on April 20, 1961, and Serial No. 124,735 filed on July 17, 1961 now Patent No. 3,190,955.

The known processes result in black-and-white outline images. If a colored animated cartoon is desired, the several frames of the film are printed on the "cells," large sheets of cellulose acetate or other transparent carrier material, the borders between areas differing in color, but not in brightness are marked by hand-drawn lines, and the cells may then be colored by hand. The colored cells are sequentially photographed on color film to produce a 35 mm. negative from which final positive color prints are made. If a background is to be combined in this operation with the live scene by superimposing the cells on a fixed background, the outlined image portions of the cells must be made opaque by application of pigments to the reverse side of each cell.

While much labor is saved when line images are produced in the dark room or laboratory directly from a live action film, the hand colored opaque cells including some manual line work are relatively costly in material and labor. The hand-drawn lines, moreover, cannot match the steadiness and smoothness of movement inherently reproduced by lines derived mechanically from a live action motion picture.

The primary object of this invention is the production of a projectable color motion picture having the well-known characteristics of an animated colored cartoon by laboratory processing of a live action motion picture without any manual operations.

A more specific object is the production of an animated colored cartoon from a live action motion picture without manual drawing of any portion of a line picture, and also without manual coloring or opaquing of the line picture.

A further object is the manufacture of animated cartoons from photographically produced images at high speed on conventional motion picture processing equipment.

Other objects and many of the attendant features of this invention will readily be appreciated from the following description of a specific example thereof when taken in conjunction with the accompanying drawing wherein.

Figure 1:
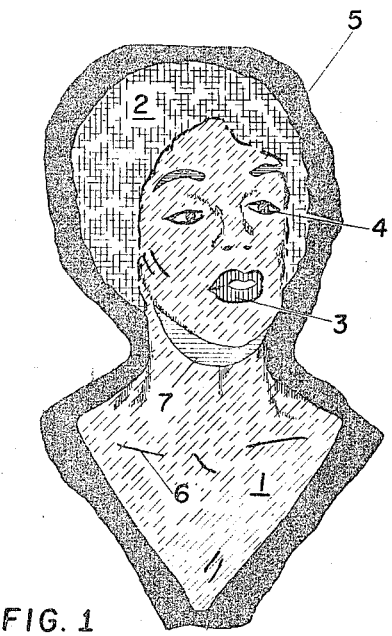
FIG. 1 shows an enlarged positive print of a color negative frame suitable for use in the process of the invention.

Referring initially to FIG. 1, there is seen a frame of a positive motion picture film prepared by conventional contact printing from a negative 35 mm. color film. Kodacolor film sold by the Eastman Kodak Company is suitable for the purpose of the invention, but any other color film capable of being developed to produce a visible image in colors complementary to those of the live scene photographed is suitable. The film sold under the name "Agfacolor" has also been successively used for this purpose.

As seen from the enlarged positive print of FIG. 1, the live scene photographed included an actress having flesh-colored skin 1, blond hair 2, red lips 3, and brown eyes 4. She was photographed against a black background 5, and wore a dress of a color not distinguishable from the background. Contrast lines 6 were drawn on the actress by means of a dark grease pencil to outline her lips, the bridge of her nose, portions of the hair line, the collarbones, and the like.

Her eyebrows and an area 7 under her chin which would be shadowed if the head were illuminated from above were covered with pure spectrum blue make up.

Figure 2:
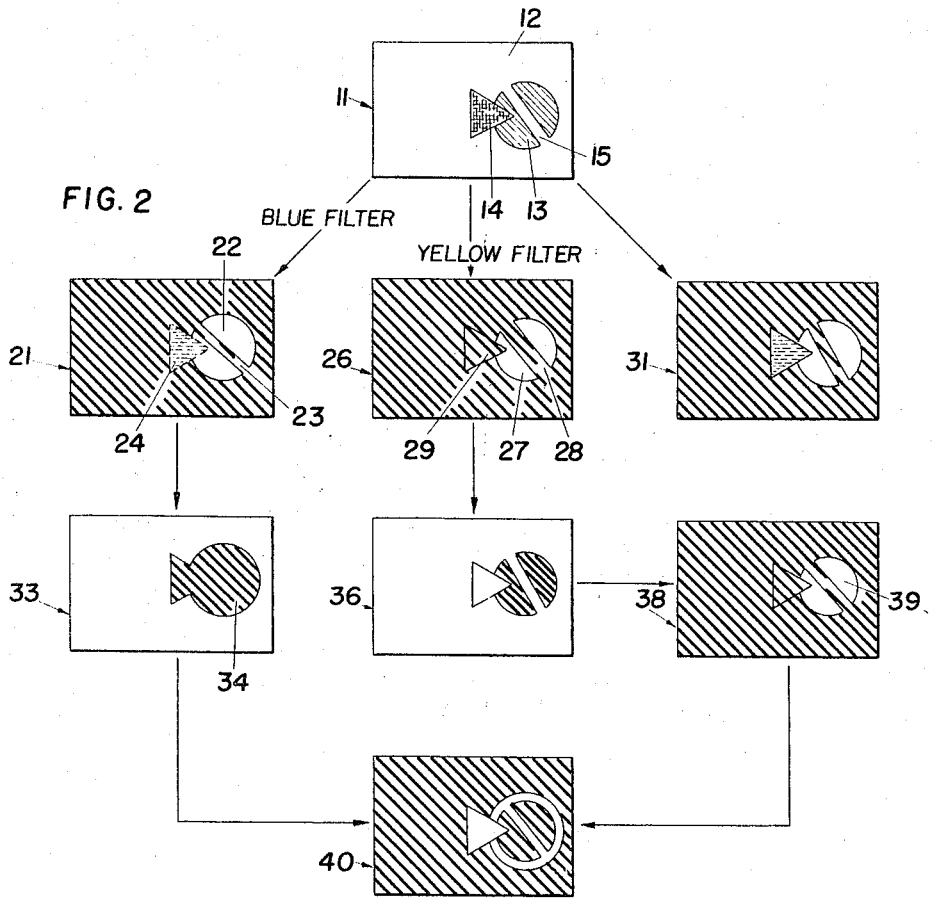
FIG. 2 is a flow sheet diagrammatically illustrating the manipulative steps of the invention leading from a live action motion picture negative on color film corresponding to the positive shown in FIG. 1 to black-and-white intermediate films and to a positive cartoon-type color film.

In the diagrammatic showinng of FIG. 2, the original negative frame corresponding to FIG. 1 is shown at 11. The background 5 of the color negative is represented by a clear rectangle 12 on which a circle 13 and a triangle 14 are superimposed. The circle stands for the bright areas of the image, such as the skin 1 and the hair 2 which appears dark bluish-green on the negative. A diametrically arranged clear band 15 on the circle 13 stands for details shading and for narrow dark areas of the original image, such as the contrast lines 6. The triangle 14 represents the blue shadow area 7 and the relatively wide blue eyebrows of the original image which are of a full yellow color in the negative.

The blue pigment of the make-up employed in the area 7 is cobalt blue which reflects light in a very narrow range of the electromagnetic spectrum. The saturated blue color of this area and of the eyebrows does not appear in any other portion of the original image.

Three intermediate positive prints on black-and-white motion picture film were made from the color negative 11 in successive runs on a conventional step-printing machine. The first intermediate print 21 was made on a high-contrast, high resolution, panchromatic emulsion of the type employed in making color separation prints in multi-color printing processes. Such an emulsion is found on commercial films sold under the name Kodalith Pan by the Eastman Kodak Company.

The color negative 11 and the film 21 were passed through the printing machine face-to-face, that is, the unexposed emulsion of the intermediate print 21 was in direct contact with the light sensitive layer of the color film 11. The print was produced by under-exposing the film 21 to blue filtered light matched to the blue color of the shadow area 7, and by developing the latent image for maximum contrast.

The positive print 21 therefore has transparent areas 22 corresponding to the lighted features of the person seen in FIG. 1. Some of the dark details of the original make-up are lost, as indicated by the reduced width of the band 23 and all blue values 24 are substantially lightened so as to partly suppress the blue eyebrows and the blue shadow area 7 of the original color positive.

The second intermediate positive print 26 was made on the same type of emulsion as the print 21, but the clear film base of the print film was run through the printing machine in contact with the photographic layer of the color negative 11. Overexposure through a yellow filter and development for high contrast produced a positive image on the second intermediate print 26 in which the opaque areas are slightly enlarged at the expense of the transparent areas 27. The contrast lines and blue areas 7 of the original subject are reproduced by image portions 28, 29 as dark as the background and fully opaque. Colors containing a high proportion of blue, such as dark brown, also appear opaque.

The third intermediate positive print 31 was produced on normal panchromatic film and developed in a conventional manner to reproduce the complements of the grey scale values of the color negative 11. The third intermediate print will hereinafter be referred to as the "color mask."

Exposure and development of the mask 31 were controlled in such a manner that the mask has zero density in the highlight areas of the original image and proportionately increasing densities in the shadow area. When the color mask is superimposed in registration on the color negative 11, the combined density of all points of the superimposed films is equal. When ordinary color film is exposed through the superimposed films and developed in the usual manner, the color saturation of the original negative is reproduced without change.

The lighted colored portions of the live scene of FIG. 1 are reproduced in such an intermediate color print by substantially the same colors, but shading within the colored areas is lost by the masking effect of the third intermediate black-and-white print. The areas which are unlighted or very dark in the live scene reproduced in the print of FIG. 1 are clear in the intermediate color print. The colored lighted portions of the original live scene thus are represented by flat positively colored areas. The black background and dark make-up appear white in the intermediate color print, and such dark colored portions of the original scene as the brown eyes and the shadow area 7 are substantially lightened.

It is usually desirable to increase the color intensity of red areas, such as lips, in human faces, and a red filter may be employed for this purpose when the color mask 31 is printed from the negative 11.

Reverting now to the flow sheet of FIG. 2, a first negative copy 33 was made from the first intermediate positive print 21. The negative copy material was fine-grained blue sensitive film material such as High Contrast Positive of Eastman Kodak Company. The positive print 21 was run through the aforementioned step-printing machine in contact with the transparent base of the unexposed negative film which was overexposed so that development resulted in an image in which the opaque area 34 corresponding to the lighted portions of the original live scene was enlarged to further absorb narrow dark areas such as contrast lines of the make-up, and even the eyes. The blue shadow area 7 of the original scene was fully absorbed into the opaque portion 34 of the first negative copy. This opaque portion corresponds to the entire lighted foreground area of the live scene illustrated in FIG. 1, and the negative copy 33 will hereinafter be referred to as the "negative foreground mask." Its opaque area is circumferentially slightly larger than the dark area of the original color negative 11, and the extent of this enlargement may be controlled by selecting the developing conditions for the intermediate print 21 and the foreground mask 33, by choice of the thickness of the base through which the emulsion of the foreground mask 33 is exposed, and by repeating the printing steps as often as needed.

In order to avoid registration problems, it has been found convenient to employ as a film base clear polyester film material commercially available under the trademark "Mylar," and characterized by good dimensional stability under conditions of varying temperature and humidity. With normal good laboratory practice, no difficulties due to improper registration have been experienced in performing the method of this invention with emulsions coated on such polyester film. A uniform film thickness of four mils (0.004") has been found satisfactory, but is obviously not critical.

The second intermediate positive film 26 was copied on blue sensitive film of the type employed for the foreground mask 33 by running the positive film 26 with the unexposed material through the printing machine, the two emulsions being in direct contact. Slight overexposure and high contrast development removed most of the shading in the lighted areas of the original image, and reduced the size of the clear area in the resulting second negative copy 36 to approximately that of the color negative 11. The shadow area 7, the blue eyebrow make-up, and all contrast lines appear transparent in the second negative copy 36.

The negative copy 36 was next copied on unexposed blue sensitive film to produce a positive background mask 38. Base-to-emulsion contact, overexposure, and high-contrast development enlarged the opaque areas of the mask 38 as compared to the corresponding clear portions of the negative copy 36. The contrasts of the background mask 38 are higher than those of the second intermediate positive print 26. All lighted areas of the original image are reproduced by fully transparent image portions 39. When the foreground mask 33 and the background mask 38 are superimposed, their opaque areas marginally overlap. A composite outline negative 40 could therefore be prepared by running an unexposed blue sensitive black-and-white film emulsion-to-emulsion through the step-printing machine first with the foreground mask 33, and thereafter with the background mask 38, or in the reversed sequence, and by thereafter developing the latent outline images formed by the exposed portions of the film.

Figure 3:
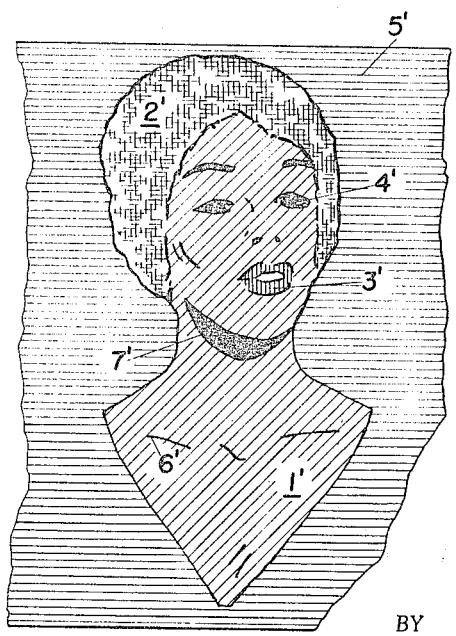
FIG. 3 shows an enlarged frame of a positive animated cartoon produced from the negative of FIG. 1 by the process of FIG. 2.

An interpositive motion picture color film one frame of which is illustrated in FIG. 3 was printed on raw color film stock from the color negative 11, the color mask 31, the masks 33, 38, the composite outline negative 40, and a negative background film in three consecutive runs through the step printing machine. In the present example, the background film was a negative color film uniformly exposed to blue light, and developed to the complementary color.

The three runs which may be taken in any desired order exposed the color sensitive emulsion of the raw color film stock to white light (a) through the color negative 11 superimposed in registration on the color mask 31;
(b) through the foreground mask 33 and the negative background color film; and
(c) through the composite line negative 40.

Normal color development of the emulsion after the triple exposure resulted in an interpositive as shown in FIG. 3. Multiple release prints may be produced from the interpositive by making an internegative and printing from it in a conventional manner if more than one positive is desired.

The interpositive illustrated in FIG. 3 differs from the positive print of the original negative live action film by outlines 6' which separate the several colored areas.

Within each area, such as in the skin area 1' and the hair area 2', the color is flat and uniform as in a hand-colored cell. The shading due to the three-dimensional nature of the object originally photographed has disappeared. The original blue make-up under the chin now appears as a black shadow 7'. The brown eyes 4 also are represented by black spots 4'. The image has the characteristic features of a colored cartoon.

Because of the choice of an almost black or black background 5 in the original live scene photographed, the use of a background mask is unnecessary. If the background 5 had contained features which were to be eliminated, the background mask 38 would have been run together with the color negative 11 and the color mask 31 through the printing machine in step (a) above.

Saturated spectral blue is not necessarily employed in the make-up for the shadow area 7, and for other relatively large portions of the original image intended to be represented by opaque areas, not by outlines, in the final print. Obviously, any other narrow portion of the spectrum not important for the remainder of the reproduced image may be selected according to specific requirements. The selected color will appear white or very light when viewed through a filter of the same color, and black when viewed through a filter of the complementary color. Two prints made from an original color film through the filters on black and white film respectively show the shadow areas dark and light. When the contrasts of the prints are increased by repeated printing and development under suitable conditions, there is finally obtained a negative and a positive in both of which the shadow area 7 is represented by a fully opaque area as shown in FIG. 2 at 33, 38. An outline image produced by combining two such prints does not show the shadow area in outline, but as a solid area, as indicated by the white triangle in the negative of FIG. 2, at 40.

The number of printing steps necessary for producing the two prints 33 and 38 depends on the contrast present in the scene originally photographed, on the characteristics of the photographic emulsions employed, and on developing techniques as will be evident to those skilled in the art. The term "printing" as employed herein thus will be understood not necessarily to be limited to the direct production of a positive by exposure of a sensitized layer through a visible image on a master negative (or vice versa), but also to include a plurality of steps, each including an exposure and a development, the visible image employed as a master in the later steps having been produced in an earlier step. It is not usually feasible, though, to reduce the number of printing steps to less than those diagrammatically illustrated in FIG. 2.

It is normally less expensive to produce the black and white films 21, 26, 31 by printing from a color film obtained from the original scene, but such a procedure is not always necessary. It is well known to photograph a scene simultaneously on two motion picture films in such a manner that each frame of one film registers precisely with a corresponding frame of the other film. An early color motion picture process employed special cameras capable of simultaneously exposing several films in such a manner. Obviously, such cameras may be employed to take a color film such as the negative 11, simultaneously with one or more black and white films exposed through filters to make the films 21, 26, 31 directly in a manner obvious to those skilled in the art.

Many other modifications and variations of the example of the invention described above will readily suggest themselves to those skilled in the art. The sequence of laboratory processing steps leading to the interpositive illustrated in FIG. 3 may be altered to employ a color positive as the starting material instead of the negative 11. A negative color mask obtained by printing an original color positive on panchromatic film, may be combined with the original color positive, a background positive film, and two masks as shown at 33, 38 in FIG. 2, to produce an internegative motion picture film complementary to the showing of FIG. 3. The manner in which the exposure and development of intermediate prints is to be controlled in order to produce the desired masks from a color positive will be obvious to those skilled in the art from the detailed descriptions of the process represented by the flow sheet of FIG. 2.

Since black-and-white film is lower in first cost, and can be processed at lower cost than color film, it is not normally practical to employ color film material in the preparation of the several intermediate prints, mattes, and masks of the invention, nor will panchromatic film normally be employed for similar reasons where the use of blue sensitive or orthochromatic film has been disclosed in the afore-described preferred example of the invention. It will be obvious, however, that color film with or without the use of filters and sources of suitably colored light may be substituted for black-and-white film, and that panchromatic film may be substituted for orthochromatic or blue sensitive film without departing from the spirit and scope of this invention.

In one of its aspects, the invention therefore resides in a method in which a color motion picture image of a live scene such as the negative 11 or the complementary positive is superimposed on a color mask of the type of mask 31. The mask may be prepared by reproducing the complement of the grey scale values of the color image, and raw color stock is exposed through the superimposed color image and color mask. A line image is derived from the color motion image by the methods previously known or first disclosed here, and the line image is printed on the same raw stock in proper registration. The exposed raw stock, when developed is the positive or negative of a colored cartoon motion picture showing the characteristic flat coloring seen in FIG. 3.

Obviously, many other modifications and variations of the present invention are possible in the light of the above teachings. It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What I claim is:
1. A method of producing an animated colored cartoon which comprises:
   (a) preparing a color motion picture film of a live scene, portions of said motion picture film differing in grey value;
   (b) preparing an outline film of said live scene;
   (c) exposing a print film through said color motion picture film;
   (d) developing the exposed print film in such a manner that the developed print film represents the complementary grey values of said color motion picture films, said color motion picture film, said developed print film, and said outline film each having a plurality of frames, respective frames of said print film and said outline film corresponding to each frame of said motion picture frame;
   (e) superimposing corresponding frames of said color motion picture film and of said developed print film in registration to form superimposed pairs of frames;
   (f) exposing respective frames of raw color film stock through said superimposed pairs;
   (g) exposing said frames of raw color film stock in registration through the corresponding frames of said outline film; and
   (h) developing the exposed raw stock.

2. A method as set forth in claim 1, wherein said outline film is black-and-white film.

3. A method as set forth in claim 1, wherein said print film is black-and-white film.

4. A method as set forth in claim 3, wherein said print film is panchromatic film.

5. A method as set forth in claim 1, wherein said outline film is prepared from said color motion picture film.

6. A method as set forth in claim 1, wherein preparing said outline film includes:
   (i) printing said color motion picture film on a first and on a second black-and-white film to produce a first intermediate film and a second intermediate film;
   (j) producing respective copies of said intermediate films, opaque portions in one of said copies corresponding to respective transparent portions in the other one of said copies, and vice versa, the opaque portions of said one copy being different in size from the corresponding transparent portions of said other copy;
   (k) printing said copies on unexposed black-and-white film stock; and
   (l) developing said black-and-white stock to produce said outline film.

7. A method as set forth in claim 6, wherein said opaque portions of each of said copies are larger than the corresponding transparent portions of the other copy, and said copies are printed on said unexposed black-and-white stock by sequentially exposing the stock through said two copies.

8. A method as set forth in claim 6, a portion of said color motion picture film having a predetermined color, printing of said first black-and-white film including the step of exposing the same through said color motion picture film to light of said predetermined color, printing of said second motion picture film including the step of exposing the same through said color motion picture film to light of a color substantially complementary to said predetermined color.

9. A method as set forth in claim 8, wherein said light of predetermined color is limited to a single narrow range of the electromagnetic spectrum.

10. A method as set forth in claim 8, wherein said predetermined color is saturated spectral blue.

11. A method as set forth in claim 1, wherein preparing said outline film includes:
    (i') producing a motion picture film carrying latent positive images of said live scene;
    (j') producing a motion picture film carrying latent negative images of said live scene, each frame of one of said last mentioned two films corresponding to a respective frame of the other film and of said color motion picture film;
    (k') developing the respective latent positive and negative images of said two films in such a manner that developed clear areas of one film are different in size from the corresponding developed opaque areas of the other film; and
    (l') printing each developed frame of said one film and the corresponding frame of said other film on a single frame of a third film.

12. A method as set forth in claim 11, in which a portion of said color motion picture film has a predetermined color, and producing said two motion picture films includes the steps of exposing one film through said color motion picture film to light of said predetermined color, and of exposing another film through said color motion picture film to light of a color substantially complementary to said predetermined color.

13. A method as set forth in claim 1, wherein said outline film includes two layers of image carrying material, the images of one layer representing a positive of said live scene, and the other layer representing a negative of said live scene, an opaque area of one layer being smaller than a corresponding clear area of the other layer, and the two layers being superimposed in registration, whereby clear outline areas are defined between the opaque areas of said layers.

References Cited by the Examiner

UNITED STATES PATENTS

| 1,860,737 | 5/1932 | Handschiegl | 352—45 |
| 2,420,636 | 5/1947 | Yule | 96—5 |
| 2,586,378 | 2/1952 | Pohl | 352—67 X |
| 2,998,313 | 8/1961 | Maurer | 96—44 |
| 3,000,737 | 9/1961 | Barnhart | 96—44 |
| 3,158,477 | 11/1964 | Ulahos | 352—45 X |

JULIA E. COINER, *Primary Examiner.*

N. G. TORCHIN, *Examiner.*

A. E. TANENHOLTZ, *Assistant Examiner.*